C. B. BUCHANAN & C. C. JOHNSON.
HEADWAY RECORDER.
APPLICATION FILED NOV. 23, 1914.

1,229,878.

Patented June 12, 1917.
3 SHEETS—SHEET 1.

Witnesses
B. Y. Brown
R. B. Cavanagh

Inventor
C. B. Buchanan
C. C. Johnson
By
Attorneys

C. B. BUCHANAN & C. C. JOHNSON.
HEADWAY RECORDER.
APPLICATION FILED NOV. 23, 1914.
1,229,878.
Patented June 12, 1917.
3 SHEETS—SHEET 2.
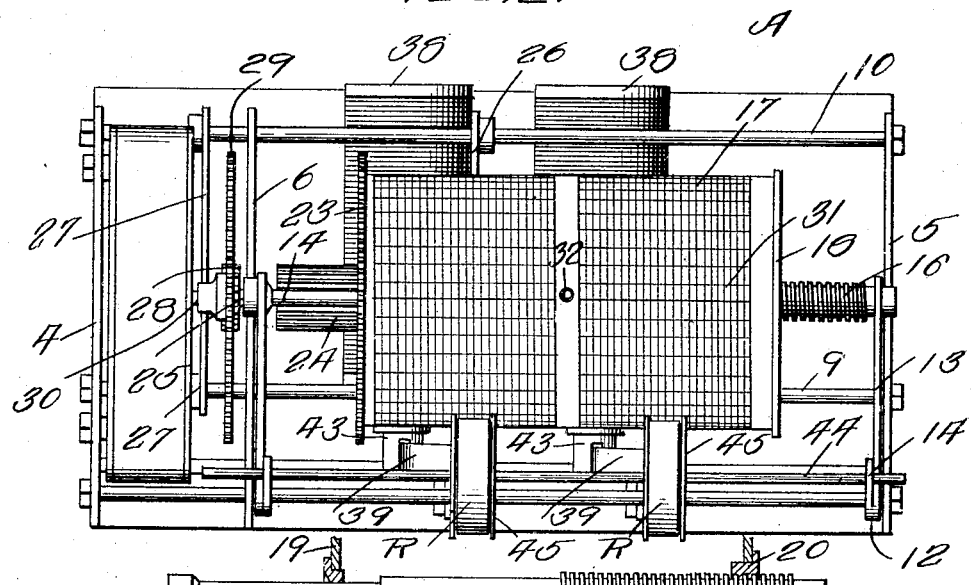
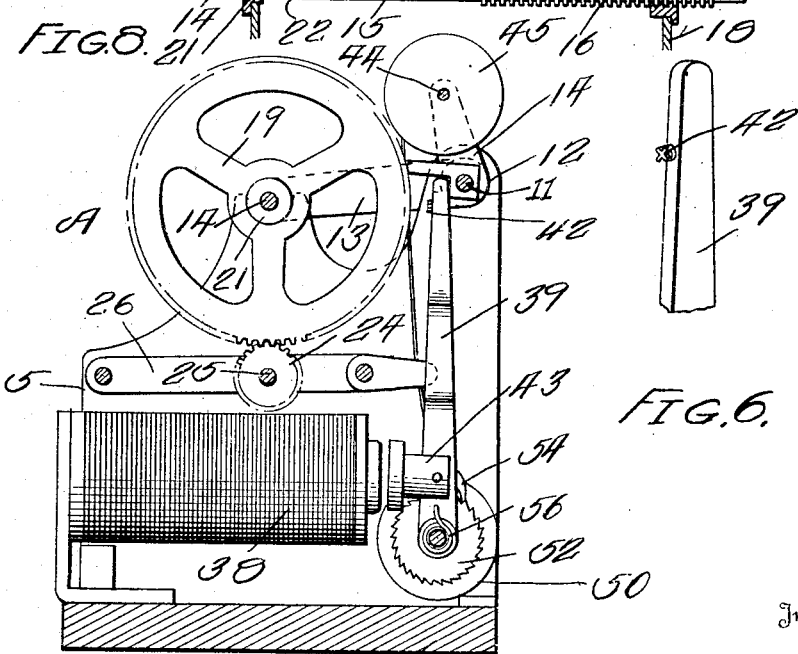
Witnesses
R. J. Brann
R. B. Cavanagh.
Inventor
C. B. Buchanan
C. C. Johnson
By Chandler & Chandler
Attorneys C. B. BUCHANAN & C. C. JOHNSON.
HEADWAY RECORDER.
APPLICATION FILED NOV. 23, 1914.
1,229,878.
Patented June 12, 1917.
3 SHEETS—SHEET 3.
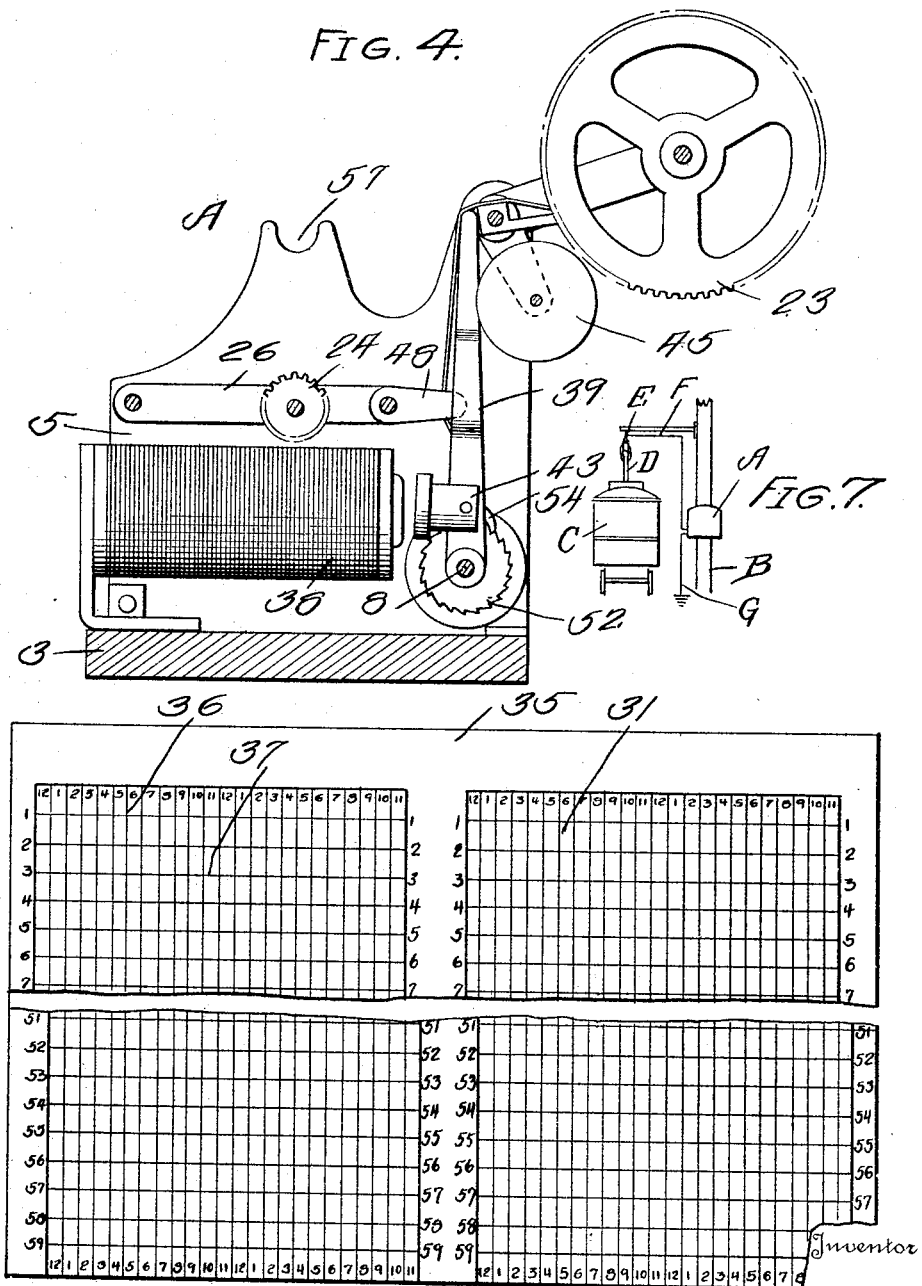

UNITED STATES PATENT OFFICE.

CYRUS B. BUCHANAN AND CHARLES C. JOHNSON, OF RICHMOND, VIRGINIA.

HEADWAY-RECORDER.

1,229,878.  Specification of Letters Patent.  Patented June 12, 1917.

Application filed November 23, 1914. Serial No. 873,613.

*To all whom it may concern:*

Be it known that we, CYRUS B. BUCHANAN and CHARLES C. JOHNSON, citizens of the United States, residing at Richmond, in the county of Henrico, State of Virginia, have invented certain new and useful Improvements in Headway-Recorders; and we do hereby declare the following to be a full, clear, and exact description of the invention, such as will enable others skilled in the art to which it appertains to make and use the same.

This invention relates to an automatic headway recorder adapted to indicate the time of the passage of a car or cars past a given point or station, and is in the nature of an improvement on the automatic headway recorder forming the subject matter of our earlier Patent No. 887,309, dated May 12, 1908. In the present instance we have shown and described, merely by way of illustration, our invention as employed in connection with an electric railway system for indicating the exact time when a car passes a given point or station, but we wish it to be understood that our invention is not limited in its useful application to this particular purpose, as it may be employed in any connection where its use will be found advantageous, convenient and desirable, such for instance, as in indicating and recording the time of the trips of an elevator car.

In the operation of electric railways it has been found necessary, in order to maintain schedules, to have time points or stations along the routes to enable the trainmen to gage the speed of their cars to keep them on schedule time. This has required the employment of inspectors, stationed along the routes or at terminals to check the pass time of cars. Likewise in large modern office buildings, which generally have both "local" and "express" passenger elevators, a starter or inspector is usually employed for the purpose of insuring that these elevator cars are run on certain time schedules, so that the congestion of the cars and the consequent annoyance and delay to those using or desiring to use the elevators is avoided. By the use of our automatic headway recorder, located at certain time points or stations along the routes, we eliminate the necessity of having inspectors to make records of the time cars leave terminals or time points, and also insure a complete record on the record sheet of the time every car passes these points or stations, which record sheet when compared with the schedule time tables will show every car that is ahead or behind time and allow the operator to correct the same.

With the above recited objects and others of a similar nature in view, our invention consists in the construction, combination and arrangement of parts set forth in and falling within the scope of the appended claims.

In the accompanying drawings:

Fig. 2 is a top plan view of the mechanism of the recorder.

Fig. 3 is a sectional view taken on the line 3—3 of Fig. 2 and looking in the direction of the arrows, and showing the record sheet drum in operative position to be driven by the clock motor.

Fig. 4 is a view similar to Fig. 3, but showing the drum swung outward or thrown back to a position to facilitate the removal of the time sheet.

Fig. 5 is a face view of one of the time sheets adapted to be placed upon the drum.

Fig. 6 is a detail perspective view of a portion of one of the key bars.

Fig. 7 is a view showing diagrammatically and conventionally the location of the recorder and the stationary contact, and a car positioned relatively thereto.

Fig. 8 is a view in elevation of the drum shaft of the recorder, with the hub portions of the drum heads shown thereon, and in section.

Figure 1:
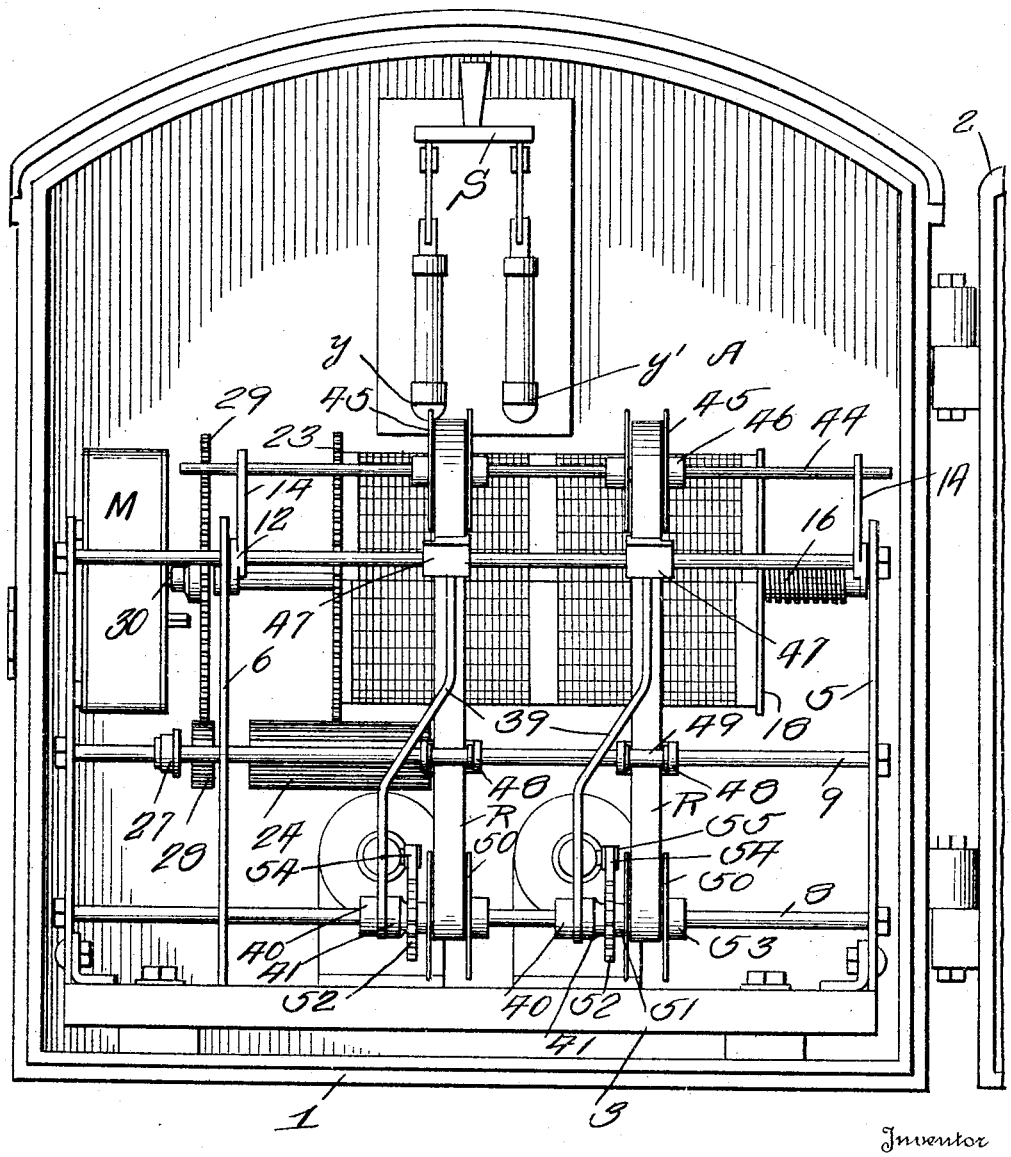
Figure 1 is a view in front elevation of a headway recorder embodying our invention and showing the same in its casing, with the door of the casing in open position.

In the present instance, we will presume by way of example, that our recorder is to be used in connection with an electric railway system for indicating the time of the passage of cars as heretofore mentioned.

Before entering into a detailed description of our invention, we will briefly say that it embraces among other features, an axially movable, rotatable drum upon which is wrapped the record sheet, this drum being driven by a clock-work motor through mechanism hereinafter mentioned in detail. This record is printed on the usual sheet through the medium of an inked ribbon and a movable type bar, the latter being actuated to strike the ribbon and print upon the record sheet when a magnet forming a part of the recorder is energized to attract an armature connected with the type bar. This magnet is energized upon the closing of an electric circuit through a circuit closer or contactor arranged to be actuated by the car in its passage past the point where the circuit closer or contactor is located. The time or record sheet is ruled, showing hours and minutes for the twenty-four hours of a day, for each direction of car movement. An examination of the sheet when the record has been made will show the time of passage of every car past the given point or station, in each direction during the entire day, and consequently the periods of time which elapse between the passage of different cars.

Referring now to the accompanying drawings in detail, and particularly to the diagrammatic view shown in Fig. 7, the letter A indicates our recorder as an entirety, which is shown as mounted upon the pole B located adjacent the track. At C, we have conventionally shown a trolley car having the usual trolley D. The circuit closer is conventionally illustrated at E, and is in circuit with the trolley wire. This circuit closer may be constructed and arranged as shown in our earlier Patent, No. 887,309, aforesaid, or may be of any other suitable character. The conductor F leads from the circuit closer to the recorder A, while G indicates a suitable return or grounded conductor. The operation of actuating the device by the passage of the car past the contact or circuit closer is substantially the same as that shown and described in our earlier patent, the present improvements residing particularly in the recorder itself.

Our improved recorder A is provided with a casing 1, which is preferably of cast iron, and weather-proof, this casing having the usual door 2. The numeral 3 designates a base of wood or other material resting upon the bottom of the casing, while 4 and 5 indicate vertical side plates of metal or other suitable material mounted on the base. A vertical plate 6 is also mounted on the base adjacent to, but spaced apart from the end plate 4, this intermediate plate 6 being arranged in parallelism with the end plates. Connecting these three plates is a bar 8 located just above the base 3, and at the front of the recorder. Likewise the longitudinally extending front and rear rods 9 and 10 respectively connect these three plates 4, 5 and 6, these rods 9 and 10 passing through the three plates at points above the bar 8. A rock shaft 11 passes through and is journaled in the upper forward end portions of the three plates 5, 6 and 7. Fast with this rock shaft 11 are the spaced angle arms 12, each arm comprising a relatively long section 13 and a relatively short section 14. Rigidly supported at its ends by the ends of the long arm sections 13, is a drum shaft, which is shown in detail in Fig. 9. Referring to said figure it will be seen that this shaft comprises a reduced end section 14, an intermediate section 15 of relatively greater cross dimensions than the end section 14, and a threaded end section 16 which is of greater cross dimensions than the intermediate section 15. Mounted on this drum shaft is a cylindrical drum 17 having skeleton heads 18 and 19 forming the ends of the drum. The head 18 is formed with a threaded hub 20 which works over the screw section 16 of the drum shaft, while the opposite head 19 is formed with a hub 21 having a smooth bore therein, just sufficiently large to accommodate the reduced end section 14 of the drum shaft. By this arrangement of the drum upon the shaft, it will be understood that such drum is adapted to be rotated and at the same time to feed longitudinally of the shaft, and the movement of the drum 7 toward the outer end of the threaded section 16 of the shaft is limited by the hub 20 of the head 19 striking against the shoulder 22 formed at the junction of the reduced end section 14 of the shaft with the intermediate section 15 thereof. The head 19 of the drum is provided with a peripherally extending circular rack 23, and from the description thus far given, it will be seen that as the angle arms carrying the drum shaft with its drum are fast with the rock shaft 11, the drum may be swung from the position shown in Figs. 1 and 6 to the position shown in Fig. 4. When the drum is thrown into operative position, as is shown in Figs. 1 and 3, the circular rack 23 is adapted to mesh with the long fluted pinion 24 fast on the rotatable shaft 25. The inner end of this shaft is journaled in a cross bar 26 supported by the rods 9 and 10, while the outer end of the shaft 25 extends through an opening in the plate 6, and is journaled in a cross bar 27 extending parallel with and between the plates 4 and 6 and supported by the rods 9 and 10. This shaft 25 also has fast therewith a pinion 28 with which meshes the relatively large gear wheel 29 carried by the shaft 30 of the clock motor M, which is arranged to rotate the shaft 30 once every hour.

Now, as will be seen by reference to Fig. 1, the gear wheel 29 is of the same size as the rack 23 of the drum and the pinions 28 and 24 are of the same gear, so that as the gear wheel 29 is completely rotated once every hour, the drum will likewise be rotated once an hour. Furthermore, it will be noted that as the drum is rotated through the gear and pinion mechanism, just described, it will also feed longitudinally of the drum shaft by reason of the engagement of the threaded hub of the drum with the screw section 16 of the stationary drum shaft.

A record sheet 31 is arranged upon the drum and held in place by inserting the pin 32 carried by the drum through the aperture 33 in the sheet, and then wrapping the sheet around the drum until the edge 34 of the sheet overlaps the edge 35. The latter edge of the sheet is preferably provided with an adhesive substance so that the overhanging end 34 may be pasted down so that the sheet will appear on the drum as shown in Fig. 2. Upon the sheet are printed lines 36 which extend longitudinally of the sheet and at an angle to the edge thereof, and intersecting the lines 36 are transversely extending lines 37. There are two series of such lines upon the sheet, one being for the cars traveling in one direction on the road, and the other for the cars traveling in the opposite direction, and in each series is a sufficient number of longitudinal lines 36 to form a number of columns equal to the numbers of the hours of the day and night, and the said columns are numbered successively at hour intervals. The transversely extending lines are numbered successively to indicate each minute in an hour. By reason of the fact that the longitudinal columns are not parallel with respect to the longitudinal edge of the sheet, when placed upon the drum a continuous helical column will be formed by the successive columns.

In order that the record sheet may be marked to indicate the progress of the cars, we provide a pair of magnets 38 which are mounted upon the base 3, and a pair of type bars 39, which are pivoted at their lower ends on the longitudinal bar 8, suitable stop collars 40 and sleeves 41 holding the type bars against lateral movement at their lower ends. Each arm 39 is provided adjacent its free end with an inking point, type, or other marking device 42. Each key bar carries an armature 43, and these armatures, when the magnets 38 are energized, are attracted by the latter, pulling with them the type bar 39 and causing the marking devices 42 to mark the time on the sheet.

Carried by the short arm sections 14 of the angle arms 12 is a rod 44 upon which may be rotatably mounted the ribbon spools 45, these spools being held against longitudinal movement on the shaft by stop collars 46. From these spools 45 unwind the inking ribbons R—R, these ribbons training down through guides 47 on the rock shaft 11 and guides 48 on the shaft 9, these latter guides being preferably provided with rollers 49. The inking ribbons are adapted to be wound upon the spools 50, rotatably mounted on the bar 8. Each spool 50 has its hub extended to one side as shown at 51 and fast with the hub of each spool is a gear wheel 52.

Stop collars 53 prevent the longitudinal movement of the spools 50 in one direction, while the sleeves 41 bearing against the gear wheels 52 of the spools prevent the longitudinal movement of the spools on the shaft 8 in the other direction. Normally engaging with each of the gear wheels 52 is a gravity pawl 54, carried by a stud 55 projecting laterally from the adjacent armature 43. It will thus be seen that when the armatures 43 are attracted by the magnets 38, the pawls 54 will ride idly over the teeth of the gear wheels 52, while when the magnets are deënergized and the armatures thrown outward with the type bars 39 by the action of the springs 56, the pawls 54 engaging with the teeth of the gear wheels 52, one tooth for each stroke, will impart an intermittent or step by step feeding movement to the winding spools 50 and thereby feed the ribbon.

Located within the casing is a knife switch S, for opening and closing the electric circuits to the magnets through the conductors Y'—Y'. It will, of course, be understood that the wiring equipment of our apparatus may be of any suitable character, and is merely herein conventionally illustrated.

From the above description, taken in connection with the accompanying drawings, the construction and operation of our improved headway recorder will be readily apparent. When it is desired to apply the record sheet to the drum, the operator may grasp the shaft 44, and as this shaft is fast with the angle arms 12, and as the latter are in turn fast on the rock shaft 11, by pulling outward on the shaft 44, the drum, as well as the upper ribbon spools, will be rocked outward to the position shown in Fig. 2, the circular rack of the drum being, of course, disengaged from the long pinion 24. The drum may now be conveniently reached, and the record sheet applied thereto as heretofore described. The drum is then thrown back to its normal position with the ends of the drum shaft resting in the recess 57 in the plates 5 and 6, and when in this position, the circular rack, of course, engages with the pinion 24. The driving motion of the clock motor M is now transmitted through the shaft 30, gear wheel 29, pinion 28, pinion 24 and circular rack 23. The drum rotates and moves longitudinally in synchronism with the movement of the shaft 30. So long as the circular rack 23 is in engagement with the pinion 24 the drum will be actuated, and the action of the car in passing the circuit closer or contactor E will cause the magnet in circuit with such contactor to be energized, thereby attracting the armature of the magnet and pulling the type bar inward until it strikes the ribbon and through the ribbon marks the time on the record sheet. When the car has passed the circuit closer or contactor E, the circuit to the magnet is broken and the type bar will be thrown away from the drum or back into its normal, inoperative position, and this movement of the type bar will, as above described, cause the pawl to feed the winding spool of the ribbon one tooth or step, thereby insuring that a freshly inked section of the ribbon will be in position for the next marking upon the sheet.

It will further be noted, especially by reference to Fig. 1, that if at any time it be desired to disengage the circular rack 23 of the drum from driving relation with the long pinion 24, so that the drum will not be rotated and caused to travel longitudinally, this may be accomplished by turning the drum with the hand to cause it to move toward the clock-work motor M, or toward the left in Fig. 1 until the circular rack drops off the outer end of the pinion, or the end nearest the clock-work motor. Thus the drum will be out of driving relation with the pinion 24, and although this pinion may continue to turn under the driving action of the motor, it will not, of course actuate the drum, and the latter remains stationary.

It will also be obvious from the above that as the circuit closing mechanism is engaged by a part of the car equipment, one of the magnets will be energized to cause a mark to be made upon the record sheet, and that the difference in time between one actuation of the circuit closing and the next time it is actuated will be indicated upon the sheet, thereby showing the number of minutes elapsing between the passage of different cars at that point where the circuit closer is located, and it will be further understood that one of the trolley wires is connected with one magnet, and the other with the other magnet, the other ends of the magnet wires being grounded, so that a record may be had of the cars traveling in both directions along the route.

It will be understood that we have shown a headway recorder, such as may be employed in connection with a double-tracked, over-head trolley type of road, and registering cars moving in both directions. Should it be desired to register cars moving only in one direction, it is obvious that we would employ only one magnet and one circuit closing mechanism.

While the mechanism shown herein is described as adapted to any over-head trolley road, it will be evident, as heretofore stated, that it may be used in any connection where it is desired to record the time when a vehicle passes a given point, as well as to indicate the hours or minutes which elapse between the passing of such point by a number of vehicles.

While we have herein shown and described one particular embodiment of our invention, we wish it to be understood that we do not confine ourselves to all the precise details of construction herein set forth by way of illustration, as modification and variation may be made without departing from the spirit of the invention or exceeding the scope of the appended claims.

What we claim is:

1. In a recording device, the combination with a frame; of a drum rotatably mounted in said frame and supported for bodily swinging and axial movements with respect to the frame, said drum being adapted to carry a record sheet, marking mechanism located adjacent the drum, and means for actuating the marking mechanism at certain times to mark upon the record sheet on the drum.

2. In a recording device, the combination with a rotatable shaft, a pinion carried thereby and mechanism for rotating the shaft, of a rotatable drum adapted to carry a record sheet and movable longitudinally with respect to said shaft, a circular gear rack for the drum adapted to mesh with the pinion, whereby said drum will be rotated when the pinion shaft is rotated, and means for bodily swinging said drum to move the rack thereof into and out of engagement with the pinion.

3. In a recording device, the combination with a suitable frame, of a rotatable shaft carrying a pinion, mechanism for rotating the pinion carrying shaft, a drum shaft including a threaded section, a record sheet carrying drum axially movable upon the drum shaft and having a threaded hub section engageable with the threaded section of the drum shaft, a circular rack carried by said drum and adapted to mesh with the pinion, a rock shaft and connections between the rock shaft and the drum shaft whereby said drum shaft may be swung to move the circular rack of the drum into and out of engagement with the pinion.

4. In a recording device, the combination of a rotatable, axially movable drum adapted to carry a record sheet, a motor, power transmission mechanism interposed between the motor and the drum for driving the latter, means for bodily swinging said drum into and out of driven relation relative to the power transmission mechanism, and marking mechanism located adjacent the drum and adapted at certain times to mark upon the record sheet carried by the drum.

5. In a recording device, the combination with a frame, of a rock shaft carried thereby, a drum shaft and a spool shaft connected with the rock shaft to rock with the latter, an axially rotatable drum mounted on the drum shaft and adapted to carry a record sheet, means for driving the drum, a ribbon spool carried by the spool shaft, a second ribbon spool around which and the first mentioned spool a printing ribbon is adapted to travel, and a printing device arranged in juxta-position to the printing ribbon and adapted to be moved at certain times into contact with the ribbon to print upon the record sheet carried by the drum.

6. In a recording device, the combination with a frame, of a motor including a motor shaft, a rotatable drum geared with the motor shaft, said drum being adapted to carry a record sheet and movable longitudinally with respect to said shaft, and a rock shaft with which said drum is connected, said rock shaft being shiftable to swing said drum in and out of geared relation with the motor shaft.

7. In a recording device, the combination with a frame, a motor including a motor shaft, a rock shaft, a stationary drum shaft, connections between the rock shaft and the drum shaft to enable the drum shaft to swing when the rock shaft is rocked, a drum rotatably mounted on the drum shaft and adapted to carry a record sheet, and gearing interposed between and adapted to connect the drum in driven relation with the motor shaft.

8. In a recording device, the combination with a drum shaft, of a drum rotatably mounted and axially movable upon the drum shaft and adapted to carry a record sheet, a circular rack carried by the drum, a relatively long pinion meshing with said circular rack, a shaft upon which said pinion is mounted, a second pinion on the shaft with the first mentioned pinion, a gear wheel meshing with the second pinion, a motor having a shaft upon which said gear wheel is mounted, and a marking device located adjacent the drum and adapted to be operated at certain times to mark upon a record sheet carried by the drum.

9. In a recording device, the combination with a frame, of a rock shaft carried thereby, a pair of arms fast with and movable with the rock shaft, a drum shaft supported by said arms, a rotatable drum mounted on said shaft for movement axially thereof and adapted to swing with the rocking of the rock shaft, said drum being adapted to carry a record sheet, means for driving the drum, and a marking device arranged adjacent the drum and adapted to mark upon the record sheet carried by the drum, at predetermined times.

10. The combination with a stationary shaft having a screw-threaded section, of a drum rotatably mounted on the shaft and engaging with the screw-threaded section to move axially of the shaft, a circular rack carried by the drum, a pinion engaging with said rack, a shaft upon which the pinion is mounted, a second pinion on the shaft with the first mentioned pinion, a gear wheel, a clock motor having a shaft upon which said gear wheel is mounted, a printing ribbon located adjacent the drum, a movable impression bar located in juxta-position to the ribbon, and an electro-magnet normally in open-circuit, and adapted when the circuit is closed to actuate said bar to cause the same to contact with the ribbon and print upon the record sheet.

11. A recording device including a rock shaft, a motor, a pinion connected in driving relation with the motor, and a rotatable drum connected with the rock shaft to swing with the rocking of the rock shaft and having a circular rack adapted to mesh with the pinion, said rack being rotatable by and movable longitudinally of such pinion.

12. In a recording device, the combination with a motor including a motor shaft, a drum shaft, a drum rotatably mounted on the drum shaft and adapted to move axially thereof, a circular gear carried by the drum, a relatively long pinion meshing with said circular gear and connected in driven relation with the motor shaft, said circular gear being rotated by the pinion and at the same time movable longitudinally thereof, said gear being adapted to move off one end of the pinion whereby the drum will be disconnected from driven relation with the pinion.

In testimony whereof, we affix our signatures in the presence of two witnesses.

CYRUS B. BUCHANAN.
CHARLES C. JOHNSON.

Witnesses:
T. JACK HUNDLEY,
C. C. CLIFTON.

Copies of this patent may be obtained for five cents each, by addressing the "Commissioner of Patents, Washington, D. C."